UNITED STATES PATENT OFFICE.

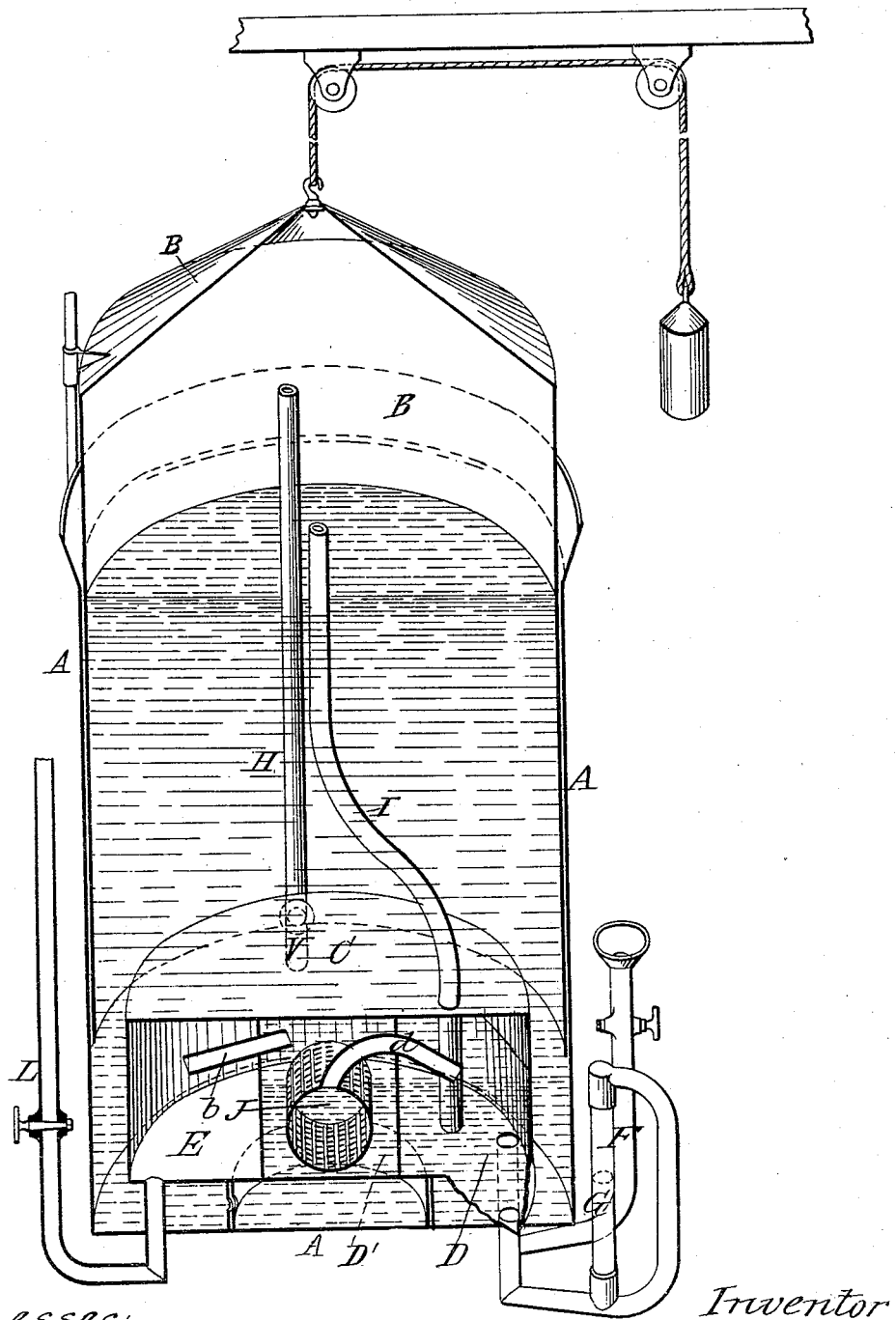

CHARLES B. LOVELESS, OF SYRACUSE, NEW YORK.

IMPROVED APPARATUS FOR CARBURETING AIR.

Specification forming part of Letters Patent No. 53,843, dated April 10, 1866.

*To all whom it may concern:*

Be it known that I, CHARLES B. LOVELESS, of Syracuse, in the State of New York, have invented certain new and useful Improvements in Apparatuses for Carbureting Air or generating gas by forcing atmospheric air into contact with a volatile oil, such as naphtha, coaloil, &c.; and I do hereby declare that the following is a full and exact description thereof, reference being had to the accompanying drawing, and to the letters of reference thereon marked.

The drawing is a perspective section.

This invention relates to that class of gas-generators in which a blower forces atmospheric air into close contact with a volatile oil, so that an illuminating-gas results from their combination.

In the drawing, A represents the tank to be filled with water, and B represents the blower or air-holder, similar to the tank and blower described in my former application.

C is a closed cylinder, of less diameter than the tank, and so arranged near the bottom of the tank as to be completely surrounded by water. This cylinder C is divided into two oil-chambers, D D', and an air-chamber, E.

D is the first oil-chamber; D', the second oil-chamber, separated from the chamber D by a partition having holes in it, so as to permit the oil in both chambers to have the same level.

F is the oil-feed pipe, entering at the bottom of oil-chamber D, and through which the oil is fed into the machine.

G is the glass gage for indicating the depth of oil in the chambers. It communicates with the bottom of chamber D. It is bent into the form of a D, so that there is sufficient air-space in the curve of the D to allow the oil to rise and fall in the glass tube just as it does in the chambers.

H is the air-feed pipe, the lower end being at the bottom of the tank and provided with an automatic valve, and the upper end opening in the tank above the water therein. As the air holder or blower B is raised the valve V opens and allows the atmospheric air to flow in until the blower is filled with air above the water in the tank.

I is the pipe through which the air is forced into the oil-chamber D. The upper end of this pipe is open just above the surface of the water, and its lower end is open in the oil-chamber D, near its bottom.

J is a perforated cylinder, closed at the ends in the oil-chamber D', and is in communication with the upper part of oil-chamber D through pipe *a*.

E is the gas-chamber, and is the last of the three chambers formed by partitions in the cylinder C. The gas produced in chambers D D' is carried into the gas-chamber E through pipe *b*.

L is the supply gas-pipe, extending from the bottom of the gas-chamber E to the burner.

The operation is extremely simple and effective, and quite similar to that described in my pending application for a patent.

The tank being filled with water and the chambers D and D' nearly filled with the oil or naphtha, the blower B is elevated, thus filling it with air. As it descends the air is forced through pipe I into the oil in the oil-chamber D, so as to form a sort of gas or gasoline, the pressure still continuing. This gasoline passes through pipe *a* into the perforated cylinder J, submerged in the oil of chamber D'. Thence it passes upward through the oil and through pipe *b* into the gas-chamber E. Thence it is conducted to the burners by the pipe L.

The chief advantage of my invention consists in placing the oil and gas chambers under water at the atmospheric temperature, so that the gasoline or gas is produced at so low a temperature as to completely preclude condensation of the gas in the pipes.

By placing the oil and gas chambers in the water-tank and constructing them in a closed cylinder I make a more compact and durable machine than any heretofore constructed.

Having thus fully described my invention, what I claim as new, and desire to secure by Letters Patent, is—

1. Placing the oil and gas chambers under water in the tank, substantially as described, and for the purposes specified.

2. The closed cylinder C, containing the oil and air chambers, substantially as set forth.

3. The glass indicator G, constructed and operating substantially as described.

4. The oil-feed pipe F, passing (in part) through the water, substantially as described.

5. The supply gas-pipe L, passing (in part) through the water, substantially as described.

6. The tank A and blower B, in combination with the closed cylinder C, substantially as described.

In testimony that I claim the above I have hereunto set my hand this 17th day of August, 1865.

C. B. LOVELESS.

In presence of—
 WM. H. POST,
 GEO. M. MASTERYON.